(12) United States Patent
Qiao et al.

(10) Patent No.: US 10,991,972 B2
(45) Date of Patent: Apr. 27, 2021

(54) ELECTROLYTE SOLUTION, POSITIVE ELECTRODE, AND LITHIUM-ION BATTERY COMPRISING THE ELECTROLYTE SOLUTION AND/OR THE POSITIVE ELECTRODE

(71) Applicant: BYD COMPANY LIMITED, Shenzhen (CN)

(72) Inventors: Feiyan Qiao, Shenzhen (CN); Sheng Wang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 358 days.

(21) Appl. No.: 16/073,237

(22) PCT Filed: Jan. 17, 2017

(86) PCT No.: PCT/CN2017/071365
§ 371 (c)(1),
(2) Date: Jul. 26, 2018

(87) PCT Pub. No.: WO2017/128989
PCT Pub. Date: Aug. 3, 2017

(65) Prior Publication Data
US 2019/0036156 A1    Jan. 31, 2019

(30) Foreign Application Priority Data

Jan. 29, 2016    (CN) .......................... 201610067193.1

(51) Int. Cl.
*H01M 10/0525*    (2010.01)
*H01M 4/131*    (2010.01)
(Continued)

(52) U.S. Cl.
CPC ....... *H01M 10/0525* (2013.01); *H01M 4/131* (2013.01); *H01M 4/1391* (2013.01);
(Continued)

(58) Field of Classification Search
CPC ......... H01M 10/0567; H01M 10/0569; H01M 2300/0025
See application file for complete search history.

(56) References Cited

U.S. PATENT DOCUMENTS

2003/0086863 A1* 5/2003 Noguchi .............. H01M 4/525
423/599
2008/0020285 A1* 1/2008 Horikawa ......... H01M 10/0569
429/325

(Continued)

FOREIGN PATENT DOCUMENTS

CN    101114717 A    1/2008
CN    101385185 A    3/2009
(Continued)

OTHER PUBLICATIONS

Oyaizu, "Palladium-Catalyzed Synthesis of Oligo(methylthio)aniline and Conversion to Polyacene-Type Electrolytes Bearing Phenothiazinium Repeating Units", Macromolecular Chemistry and Physics, vol. 203., p. 1328-1336. (Year: 2002).*
Sep. 10, 2020 STIC search for U.S. Appl. No. 16/073,237 (Year: 2020).*
The World Intellectual Property Organization (WIPO) International Search Report for PCT/CN2017/071365 dated Mar. 21, 2017 5 Pages (including translation).
Naoi, Katsuhiko et al., "Electrochemistry of Poly (2, 2'-dithiodianiline): A New Class of High Energy Conducting Polymer Interconnected with S—S Bonds", Cooperative Research Center, Tokyo University of Agriculture and Technology, Koganel, Tokyo 184, Japan. J. Electrochem. Soc., vol. 144, No. 6, Jun. 1997, The Electrochemical Society, Inc. Downloaded on Nov. 16, 2018 to IP 145.64.134.242 address. p. 1-3.

*Primary Examiner* — Sarah A. Slifka
*Assistant Examiner* — Brent C Thomas
(74) *Attorney, Agent, or Firm* — Anova Law Group, PLLC

(57) ABSTRACT

An electrolyte solution, a positive electrode, and a lithium-ion battery containing the electrolyte solution and/or the positive electrode are provided. The electrolyte solution comprises a lithium salt, an electrolyte solvent, and an additive, wherein the additive is an aniline compound having a structure of Formula 1 or a derivative thereof:

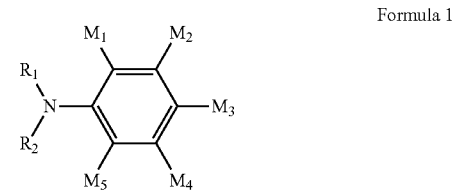

Formula 1 in which $R_1$ and $R_2$ are each independently selected from at least one of —H, —$(CH_2)_{n1}CH_3$, and —$(CH_2)_{n2}CF_3$, where $0 \leq n2 \leq 3$, and $0 \leq n2 \leq 3$; and $M_1$-$M_5$ are each independently selected from at least one of —H, —F, —Cl, —Br, —$(CH_2)_{n3}CH_3$, and $R_3$—S—$R_4$, where $0 \leq n3 \leq 3$, and at least one of $M_1$-$M_5$ is selected from a thioether group $R_3$—S—$R_4$, where $R_3$ is selected from —$(CH_2)_{n4}$—, in which $0 \leq n4 \leq 1$, and $R_4$ is selected from one or two of an aniline group or —$(CH_2)_{n5}CF_3$, where $0 \leq n5 \leq 3$. By adopting the aniline compound having a structure of Formula 1 or a derivative thereof as a specific additive in the present invention, the positive electrode is protected from being damaged, and the electrolyte solvent is protected from being oxidized and decomposed at a high voltage, thereby increasing the service life of a battery at a high voltage.

18 Claims, No Drawings

(51) Int. Cl.
  *H01M 10/0567* (2010.01)
  *H01M 10/0569* (2010.01)
  *H01M 10/052* (2010.01)
  *H01M 4/505* (2010.01)
  *H01M 4/1391* (2010.01)
  *H01M 4/525* (2010.01)
  H01M 4/02 (2006.01)

(52) U.S. Cl.
  CPC ........... *H01M 4/505* (2013.01); *H01M 4/525* (2013.01); *H01M 10/052* (2013.01); *H01M 10/0567* (2013.01); *H01M 10/0569* (2013.01); H01M 2004/028 (2013.01); H01M 2300/0002 (2013.01); H01M 2300/0025 (2013.01)

(56) References Cited

U.S. PATENT DOCUMENTS

| | | |
|---|---|---|
| 2011/0294019 A1 | 12/2011 | Amine et al. |
| 2013/0022863 A1 | 1/2013 | Madabusi et al. |
| 2015/0171468 A1 | 6/2015 | Sasaki et al. |

FOREIGN PATENT DOCUMENTS

| | | |
|---|---|---|
| CN | 102709589 A | 10/2012 |
| CN | 103035945 A | 4/2013 |
| CN | 103794815 A | 5/2014 |
| JP | 2016001567 A | 1/2016 |
| WO | 2015149345 A1 | 10/2015 |

OTHER PUBLICATIONS

\* cited by examiner

ELECTROLYTE SOLUTION, POSITIVE ELECTRODE, AND LITHIUM-ION BATTERY COMPRISING THE ELECTROLYTE SOLUTION AND/OR THE POSITIVE ELECTRODE

CROSS-REFERENCE TO RELATED APPLICATIONS

This application is a national phase entry under 35 U.S.C. § 371 of International Application No. PCT/CN2017/071365, filed on Jan. 17, 2017, which claims the priority to and benefit of Chinese Patent Application No. 201610067193.1 filed on Jan. 29, 2016 with the State Intellectual Property Office of China, entire content of all of which is incorporated herein by reference in its entirety.

BACKGROUND

Technical Field

The present invention relates to the technical field of lithium ion batteries and, particularly to an electrolyte solution, a positive electrode, and a lithium-ion battery comprising the electrolyte solution and/or the positive electrode.

Related Art

Since the 1990s, lithium ion secondary batteries have achieved rapid development. Generally, a lithium-ion battery with an electrolyte solution comprises a housing, and a battery cell and the electrolyte solution accommodated in the housing, where the battery cell comprises a positive electrode, a negative electrode, and a separator between the positive electrode and the negative electrode. During a charge process, lithium ions migrate from the positive electrode through the electrolyte solution to the negative electrode, and flow in a reverse direction during a discharge process. In recent years, high-energy-density secondary lithium-ion batteries have become a subject of interest. As such, it is also noticed that some new active materials monolithically useful in secondary lithium batteries, such as the new 5V high-voltage positive electrode material known in the prior art, have increased working voltage, which directly improves the power of the battery as a whole, thus having great practical significance in application. At present, the vast majority of electrolyte solution systems in the lithium batteries can only be used stably at a voltage of 4.5 v and below. When the working voltage exceeds 4.5 v, the electrolyte solution system is oxidized and decomposed so that the battery cannot work properly. This causes a great limitation to the use of high-voltage positive electrode materials. Moreover, the cycling performance of the battery is reduced.

The electrolyte solution used in the art includes seeking for new electrolyte solvents and the use of positive electrode film-forming protective additives. There are many studies on new electrolyte solutions. In most of the studies, new solvents are used to replace existing systems. However, there are disadvantages such as low electrical conductivity or large viscosity. Moreover, in the prior art, there is a technical problem that the electrolyte solvent undergoes an oxidation reaction with the active site on the positive electrode at a high potential, such that the solvent is further oxidized and decomposed to cause excessive consumption of the electrolyte solvent.

SUMMARY

The present invention aims to solve, at least to some extent, one of the technical problems in the related art. Therefore, an object of the present invention is to provide an electrolyte solution, a positive electrode, and a lithium ion battery comprising the electrolyte and/or the positive electrode, thereby effectively solving the technical problem existing in the prior art that the electrolyte solvent is susceptible to oxidation decomposition at a high potential.

According to an aspect of the present invention, the present invention provides an electrolyte solution. According to an embodiment of the present invention, the electrolyte solution comprises a lithium salt, an electrolyte solvent, and an additive, where the additive is an aniline compound having a structure of Formula (1) or a derivative thereof:

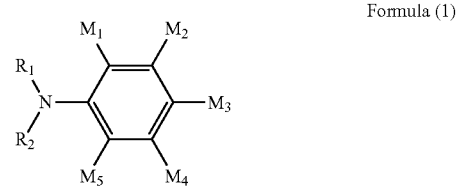

Formula (1)

in which R1 and R2 are each independently selected from at least one of —H, —(CH$_2$)$_{n1}$CH$_3$, and —(CH$_2$)$_{n2}$CF$_3$, where 0≤n1≤3, and 0≤n2≤3; and M$_1$-M$_5$ are each independently selected from at least one of —H, —F, —Cl, —Br, —(CH$_2$)$_{n3}$CH$_3$, and R$_3$—S—R$_4$, where 0≤n3≤3, and at least one of M$_1$-M$_5$ is selected from a thioether group R$_3$—S—R$_4$, where R$_3$ is selected from —(CH$_2$)$_{n4}$—, in which 0≤n4≤1, and R$_4$ is selected from one or two of an aniline group, and —(CH$_2$)$_{n5}$CF$_3$, in which 0≤n5≤3.

According to another aspect of the present invention, the present invention provides a positive electrode, which comprises a positive electrode current collector and a positive electrode material layer located on the surface of the positive electrode current collector. The surface of the positive electrode material layer has a polymer film formed through polymerization of the additive in the electrolyte solution according to the above embodiment of the present invention.

According to another aspect of the present invention, the present invention provides a lithium-ion battery, which comprises a housing, and a battery cell and an electrolyte solution accommodated in the housing. The battery cell comprises a positive electrode, a negative electrode, and a separator between the positive electrode and the negative electrode. The electrolyte solution is an electrolyte solution provided in an embodiment of the present invention; and/or the positive electrode is a positive electrode provided in an embodiment of the present invention.

In the present invention, an aniline compound having a structure of Formula (1) or a derivative thereof is added as an additive to an electrolyte solution, to effectively block the redox reaction of the electrolyte solution on the surface of the positive electrode, so that the positive electrode is protected from being damaged, and the electrolyte solvent is protected from being oxidized and decomposed at a high voltage, thereby increasing the service life of a battery at a high voltage.

The aniline compound having a structure of Formula (1) and a derivative thereof according to the present invention can be used as a specific additive in the present invention, that is, an electrolyte additive that forms a film at a voltage of 3.5-4.2 V. Such additives trend to form a protective film on the surface of the positive electrode. This film is a polymer film having flexibility, oxidation resistance, and stability, and can effectively prevent the electrolyte solution from undergoing redox reaction at the positive electrode, protect the electrolyte solution from excessive consumption, protect the positive electrode from damage, and protect the electrolyte solvent from being oxidized and decomposed at a high potential, thereby increasing the service life of the battery at high voltage. Compared with the additives in the prior art, the use of the specific additive of the present invention can realize the application of a common electrolyte solvent in a high voltage environment of 4.8V with a remarkable effect, thus making a great contribution to the art.

The electrolyte solution provided in the present invention is used in a battery. During the charge and discharge processes of the battery, the additive in the electrolyte solution undergoes a polymerization reaction at a specific surface of the positive electrode at a potential of 3.5-4.2 V, and the additive can be completely consumed in the first reaction, thus causing no influence to the function of the battery system.

DETAILED DESCRIPTION

To make the technical problem to be solved, the technical solution, and the beneficial effects of the present invention clearer, the present invention is described in further detail below.

According to an aspect of the present invention, the present invention provides an electrolyte solution. The electrolyte solution comprises a lithium salt, an electrolyte solvent, and an additive, where the additive is an aniline compound having a structure of Formula (1) or a derivative thereof.

In the electrolyte solution provided in the present invention, the aniline compound having a structure of Formula (1) or a derivative thereof is used as an additive in the electrolyte solution according to an embodiment of the present invention. The additive undergoes a polymerization reaction at a potential of 3.5-4.2 V and forms a protective film on the surface of a positive electrode, thereby effectively preventing the electrolyte solution from undergoing redox reaction on the surface of the positive electrode, protecting the positive electrode from damage, and protecting the electrolyte solvent from being oxidized and decomposed at a high potential. Therefore, the additive is obviously advantageous over common additives.

In the present invention, the additive used is an aniline compound having a structure of Formula 1 or a derivative thereof. Specifically, the structure of Formula 1 is as shown below:

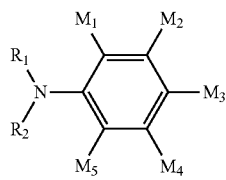

Formula 1 in which R1 and R2 are the same or different, and R1 and R2 are each independently selected from at least one of —H, —(CH2)$_{n1}$CH$_3$, and —(CH$_2$)$_{n2}$CF$_3$, where $0 \leq n1 \leq 3$ and $0 \leq n2 \leq 3$; $M_1$-$M_5$ are each independently selected from at least one of —H, —F, —Cl, —Br, —(CH$_2$)$_{n3}$CH$_3$, and $R_3$—S—$R_4$, where $0 \leq n3 \leq 3$, and at least one of $M_1$-$M_5$ is selected from a thioether group $R_3$—S—$R_4$, where $R_3$ is selected from —(CH$_2$)$_{n4}$—, in which $0 \leq n4 \leq 1$, and $R_4$ is selected from one or two of an aniline group and —(CH$_2$)$_{n5}$CF$_3$, where $0 \leq n5 \leq 3$. By means of the specific additive of the present invention, the application of a common electrolyte solution in a high voltage environment of 4.8V is achieved.

According to an embodiment of the present invention, when $M_1$-$M_5$ in Formula 1 comprises at least one thioether group $R_3$—S—$R_4$, the additive is able to be oxidized and polymerized at a potential to form a polymer film.

According to an embodiment of the present invention, the additive is one or more selected from 4-trifluoromethylthioaniline, 2-trifluoromethylthioaniline, 3-trifluoromethylthioaniline, 3-chloro-2-trifluoromethylthioaniline, 3-chloro-4-trifluoromethylthioaniline, 3-fluoro-4-trifluoromethylthioaniline, 3-fluoro-2-trifluoromethylthioaniline, 4,4'-dithiodianiline, 2-chloro-4,4'-dithiodianiline, 3-chloro-4,4'-dithiodianiline, 2-fluoro-4,4'-dithiodianiline, and 3-fluoro-4,4'-dithiodianiline. The structure is specifically:

4-trifluoromethylthioaniline:

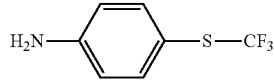

2-trifluoromethylthioaniline:

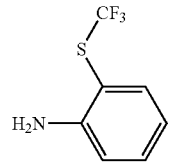

3-trifluoromethylthioaniline:

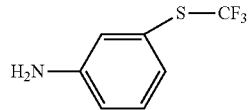

3-chloro-2-trifluoromethylthioaniline:

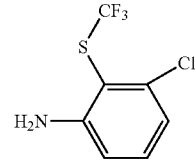

4,4'-dithiodianiline:

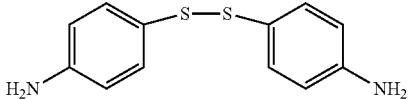

3-chloro-4-trifluoromethylthioaniline:

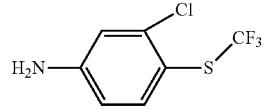

-continued 3-fluoro-4-trifluoromethylthioaniline:

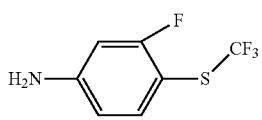

3-fluoro-2-trifluoromethylthioaniline:

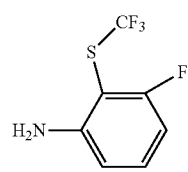

2-chloro-4,4'-dithiodianiline:

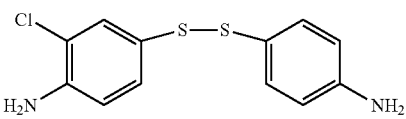

3-chloro-4,4'-dithiodianiline:

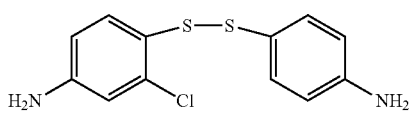

2-fluoro-4,4'-dithiodianiline:

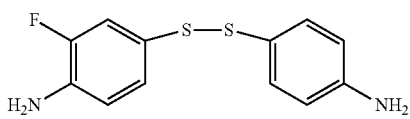

3-fluoro-4,4'-dithiodianiline:

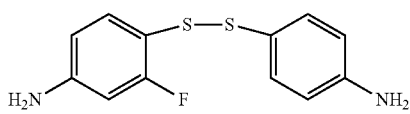

According to an embodiment of the present invention, the content of the additive is 0.1-10 wt % and preferably 0.1-3 wt % based on the total weight of the electrolyte solution. When the content is preferably 0.1-3 wt %, the additive can form a film layer with sufficient thickness and sufficient coverage on the surface of the positive electrode, and no excess additive is remained to cause impact on the system.

According to an embodiment of the present invention, the concentration of the lithium salt in the electrolyte solution is 0.3-2 mol/L. The lithium salt may be selected from one of $LiPF_6$, $LiClO_4$, $LiBF_4$, $LiAsF_6$, $LiSiF_6$, $LiAlCl_4$, $LiBOB$, $LiODFB$, $LiCl$, $LiBr$, $Lii$, $LiCF_3SO_3$, $Li(CF_3SO_2)_3$, $Li(CF_3CO_2)_2N$, $Li(CF_3SO_2)_2N$, $Li(SO_2C_2F_5)_2N$, $Li(SO_3CF_3)_2N$, and $LiB(C_2O_4)_2$, or be used in a mixture thereof. In a further preferred embodiment, LiPF6 is employed as a primary lithium salt in the present invention.

According to an embodiment of the present invention, the electrolyte solvent may be selected from one or more of ethylene carbonate (EC), propylene carbonate (PC), dimethyl carbonate (DMC), diethyl carbonate (DEC), methyl ethyl carbonate (EMC), methyl formate (MF), methyl acetate (MA), methyl propionate (MP), ethyl acetate (EP), 1,3-propane sultone (1,3-PS), ethylene sulfate (DTD), propylene sulfate, ethylene sulfite (ES), propylene sulfite (PS), adiponitrile (ADN), succinonitrile (SN), diethyl sulfite (DES), γ-butyrolactone (BL), and dimethyl sulfoxide (DMSO). According to an embodiment of the present invention, the electrolyte solvent is preferably one or more of ethylene carbonate (EC), propylene carbonate (PC), dimethyl carbonate (DMC), diethyl carbonate (DEC), and methyl ethyl carbonate (EMC).

Further, in a high voltage environment, a carbonate electrolyte solvent undergoes an oxidation-reduction reaction at the positive electrode, such that the electrolyte solvent is oxidized and decomposed at a high potential and the positive electrode is damaged, resulting in a reduced service life of the battery at high voltage. After the additive having a structure of Formula 1 provided in an embodiment of the present invention is added to the electrolyte solvent, the electrolyte solvent is enabled to be used in a high-voltage environment of 4.8 V, thus achieving a significant effect over the prior art. Moreover, the electrolyte solution system is more stable and has more wide use, the lithium salt has a high degree of dissociation, the additive has good solubility, and the oxidation polymerization process of the additive is not affected by the electrolyte solvent.

According to an embodiment of the present invention, the electrolyte solution further comprises one or more of dimethyl sulfoxide, γ-butyrolactone, adiponitrile, and ethylene sulfite. The volume ratio of the carbonate solvent to dimethyl sulfoxide is 23:2, the volume ratio of the carbonate solvent to γ-butyrolactone is 19:1, the volume ratio of the carbonate solvent to adiponitrile is 9:1, and the volume ratio of the carbonate solvent to ethylene sulfite is 93:7.

According to a second aspect of the present invention, the present invention provides a positive electrode, which comprises a positive electrode current collector and a positive electrode material layer located on the surface of the positive electrode current collector. The surface of the positive electrode material layer has a polymer film composed of a polymer produced with the additive in the electrolyte solution provided in the above embodiment.

According to an embodiment of the present invention, the polymer is one or more of poly4-trifluoromethylthioaniline, poly2-trifluoromethylthioaniline, poly3-trifluoromethylthioaniline, poly3-chloro-2-trifluoromethylthioaniline, poly3-chloro-4-trifluoromethylthioaniline, poly3-fluoro-4-trifluoromethylthioaniline, poly3-fluoro-2-trifluoromethylthioaniline, poly4,4'-dithiodianiline, poly2-chloro-4,4'-dithiodianiline, poly3-chloro-4,4'-dithiodianiline, poly2-fluoro-4,4'-dithiodianiline, and poly3-fluoro-4,4'-dithiodianiline.

The polymer film is a protective film formed with the additive in the electrolyte solution provided in the above embodiment on the surface of the positive electrode at a potential of 3.5-4.2 V.

The electrolyte solution for lithium-ion batteries provided in the present invention can be prepared through a method commonly used by those skilled in the art, by mixing all the components (comprising the lithium salt, the electrolyte solvent, and the additive) uniformly, where the manner and sequence of mixing are not particularly limited in the present invention.

The additive useful in the electrolyte solution of the present invention may further include other compounds, for example, but not limited to, other types of functional additives.

According to a third aspect of the present invention, the present invention provides a lithium-ion battery. In an embodiment according to the present invention, the lithium-ion battery comprises a housing, and a battery cell and an electrolyte solution accommodated in the housing. The battery cell comprises a positive electrode, a negative electrode, and a separator between the positive electrode and the negative electrode. The electrolyte solution is an electrolyte solution provided in an embodiment of the present invention; and/or the positive electrode is a positive electrode provided in an embodiment of the present invention. The positive electrode comprises a positive electrode current collector and a positive electrode material. The positive electrode material comprises a positive electrode active substance, a conductive agent, and a positive electrode binder, where the conductive agent, and the positive electrode binder may be those commonly used in the art. The negative electrode comprises a negative electrode current collector, and a negative electrode material. The negative electrode material comprises a negative electrode active substance, and a negative electrode binder. The negative electrode material may further optionally comprises a conductive agent, which is a conventional conductive agent, and may be the same as or different from the conductive agent used in the positive electrode material layer. The negative electrode binder may be one commonly used in the art.

The preparation process of the negative electrode sheet, the positive electrode sheet, and the separator is a technique known in the art, and the assembly of the battery is also a technique known in the art, which will not be described herein again.

In the lithium-ion battery provided in the present invention, the positive electrode active substance is a positive electrode material in the form of $LiNi_{0.5}Mn_{1.5}O_4$ having a spinel structure or $LiNi_{0.5}Mn_{0.5}O_2$ having a lamellar structure, and further preferably LiNi0.5Mn1.5O4 having a spinel structure, due to the higher charge and discharge potential plateau. The material is used in combination with the additive having a structure as described herein, to effect a wider electrochemical window of the electrolyte solution, thereby making the improvement on the high-voltage performance of the electrolyte solution by the electrolyte additive more prominent.

According to an embodiment of the present invention, the negative electrode active substance is, but not limited to, a lithium or graphite negative electrode, and preferably the metal lithium.

The electrolyte solution and the lithium-ion battery comprising the electrolyte solution of the present invention are further described below by way of specific examples. It should be understood that the specific examples described herein are merely provided for illustrating, instead of limiting the present invention. The raw materials used in the examples and comparative examples are all commercially available.

EXAMPLE 1

(1) Preparation of Electrolyte Solution:

In an argon-filled glove box, 12 wt % of lithium hexafluorophosphate (LiPF6) was dissolved in 100 wt % of an electrolyte solvent including ethylene carbonate (EC) and diethyl carbonate (DEC) at a volume ratio of 30:70. Then 0.1 wt % of 4-trifluoromethylthioaniline (an aniline compound having a structure of Formula (1) according to this application, in which R1 and R2 are both —H, M1, M2, M3, and M4 are all —H, and M3 is —S—CF3) was added, to obtain an electrolyte solution for lithium-ion batteries, which was designated as C1.

(2) Preparation of Lithium-Ion Battery:

A positive electrode active substance (LiNi0.5Mn1.5O4), acetylene black, and polyvinylidene fluoride were mixed uniformly at a weight ratio of 90:5:5, and then pressed on an aluminum foil to obtain a positive electrode sheet. A metal lithium sheet was used as a negative electrode sheet. A PE/PP composite separator was used as an ion exchange film. A button battery S1 was produced by using the electrolyte solution C1 prepared in this example following a conventional method in the art.

EXAMPLE 2

An electrolyte solution and a button battery were prepared following the steps as described in Example 1, except that the 4-trifluoromethylthioaniline in Step (1) was replaced by 0.5 wt % of 2-trifluoromethylthioaniline, and 8 wt % of dimethyl sulfoxide was additionally added to the electrolyte solution system. An electrolyte solution C2 for lithium-ion batteries and a button battery S2 were obtained.

EXAMPLE 3

An electrolyte solution and a button battery were prepared following the steps as described in Example 1, except that the 4-trifluoromethylthioaniline in Step (1) was replaced by 1 wt % of 3-trifluoromethylthioaniline. An electrolyte solution C3 for lithium-ion batteries and a button battery S3 were obtained.

EXAMPLE 4

An electrolyte solution and a button battery were prepared following the steps as described in Example 1, except that the 4-trifluoromethylthioaniline in Step (1) was replaced by 3 wt % of 3-chloro-2-trifluoromethylthioaniline. An electrolyte solution C4 for lithium-ion batteries and a button battery S4 were obtained.

EXAMPLE 5

An electrolyte solution and a button battery were prepared following the steps as described in Example 1, except that the 4-trifluoromethylthioaniline in Step (1) was replaced by 7 wt % of 3-chloro-2-trifluoromethylthioaniline, and 5 wt % of γ-butyrolactone was additionally added to the electrolyte solution system. An electrolyte solution C5 for lithium-ion batteries and a button battery S5 were obtained.

EXAMPLE 6

An electrolyte solution and a button battery were prepared following the steps as described in Example 1, except that the 4-trifluoromethylthioaniline in Step (1) was replaced by 10 wt % of 4,4-dithiodianiline, and 10 wt % of adiponitrile was additionally added to the electrolyte solution system. An electrolyte solution C6 for lithium-ion batteries and a button battery S6 were obtained.

EXAMPLE 7

An electrolyte solution and a button battery were prepared following the steps as described in Example 1, except that the content of 4-trifluoromethylthioaniline added in Step (1) was 12 wt % (which was beyond and higher than the content range), and 7 wt % of ethylene sulfite (ES) was additionally added to the electrolyte solution system. An electrolyte solution C7 for lithium-ion batteries and a button battery S7 were obtained.

Comparative Example 1

An electrolyte solution and a button battery were prepared following the steps as described in Example 1, except that no aniline was added in Step (1). An electrolyte solution DC1 for lithium-ion batteries and a button battery DS1 were obtained.

Comparative Example 2

An electrolyte solution and a button battery were prepared following the steps as described in Example 1, except that 2.5 wt % of fluorotrianiline additive was added in Step (1), and 5 wt % of γ-butyrolactone was additionally added to the electrolyte solution system. An electrolyte solution DC2 for lithium-ion batteries and a button battery DS2 were obtained.

Performance Test

Test of Oxidation Decomposition Potential of Electrolyte Solution

A three-electrode test method was used. A platinum sheet as a working electrode, a lithium sheet as a reference electrode and a counter electrode were used. The polymerization potential of the additive and the oxidation decomposition potential of the electrolyte solution were characterized. The test results are shown in Table 1.

TABLE 1

| Electrolyte solution | Polymerization potential of additive | Oxidation decomposition potential of electrolyte solution |
| --- | --- | --- |
| C1: | 4.1 | 5.8 |
| C2: | 4.1 | 5.6 |
| C3: | 4.2 | 5.7 |
| C4: | 4.1 | 5.6 |
| C5: | 4.2 | 5.3 |
| C6: | 4.1 | 5.2 |
| C7: | 4.1 | 5.4 |
| DC1: | \ | 4.9 |
| DC2: | \ | 5.0 |

(2) Charge and Discharge Performance Test of the Battery

The button batteries S1-S5 and DS1-DS3 from the examples and comparative examples were discharged to 0.005 V at normal temperature at a constant current of 0.1 mA, and the charged to 1.5 V at a constant current of 0.1 mA. The discharge and charge capacities of the batteries were recorded, the discharge efficiency was calculated as follows: Discharge efficiency (%)=Discharge capacity/Charge capacity×100%. The test results are shown in Table 2.

TABLE 2

| Battery | Discharge capacity/ mAh · g-1 | Charge capacity/ mAh · g-1 | Discharge efficiency/% |
| --- | --- | --- | --- |
| S1: | 133 | 148 | 89.8 |
| S2: | 125 | 145 | 86.2 |
| S3: | 130 | 147 | 88.4 |
| S4: | 128 | 143 | 89.5 |
| S5: | 126 | 147 | 80.7 |
| S6: | 124 | 148 | 78.7 |
| S7: | 118 | 147 | 75.2 |
| DS1: | 98 | 120 | 20 |
| DS2: | 58 | 100 | 58 |

(3) Test on Charge/Discharge Cycles of Batteries

The batteries were charged to 4.85 V at normal temperature at a constant current of 200 mA and then charged at a constant voltage of 4.85 V where the charge cutoff current was 20 mA. Then, the batteries were discharged to 3.0 V at a constant current of 200 mA. The initial charge and discharge capacities were recorded, and the discharge efficiency (%) was calculated. After 20, 40, 80, and 100 repeated charge and discharge cycles, the discharge capacities at the 20th, 40th, 80th, and 100th cycles were recorded, and the capacity retention rate (%) after the cycles was calculated as follows: Capacity retention rate (%)=the discharge capacity after 100 cycles/the initial discharge capacity×100%, where the cutoff voltage was 4.8V. The test results are shown in Table 3.

TABLE 3

| Battery No. | Capacity retention rate after 20 cycles | Capacity retention rate after 40 cycles | Capacity retention rate after 80 cycles | Capacity retention rate after 100 cycles |
| --- | --- | --- | --- | --- |
| S1: | 98 | 96 | 92 | 85 |
| S2: | 97 | 94 | 90 | 82 |
| S3: | 97 | 95 | 88 | 80 |
| S4: | 98 | 92 | 85 | 80 |
| S5: | 97 | 93 | 87 | 83 |
| S6: | 92 | 86 | 73 | 65 |
| S7: | 93 | 85 | 75 | 68 |
| DS1: | 70 | 60 | 45 | 30 |
| DS2: | 72 | 59 | 44 | 35 |

As can be seen from the results in Tables 1-3, the polymerization potential of the additive of the present invention is at least 4.1 V and 4.3 V at most. The oxidation decomposition potential of the electrolyte solution prepared with the specific additive of the present invention is 5.8 V at most and 5.3 V at least. The lithium-ion batteries prepared by using the electrolyte solution has good performance in the charge and discharge performance test and cycle test, and the battery can be used normally at a high voltage of 4.8V.

In the specification, the description with reference to the terms "an embodiment", "some embodiments", "example", "specific example", or "some example" and so on means that specific features, structures, materials or characteristics described in connection with the embodiment or example are embraced in at least one embodiment or example of the present invention. In the present specification, the illustrative expression of the above terms is not necessarily referring to the same embodiment or example. Moreover, the described specific features, structures, materials or characteristics may be combined in any suitable manners in one or more embodiments. In addition, where there are no contradictions, the various embodiments or examples described in this specification and features of various embodiments or examples can be combined by those skilled in the art.

Although the embodiments of the present invention have been illustrated and described above, it is to be understood that the above embodiments are exemplary and not to be construed as limiting the present invention, and that changes, modifications, substitutions and alterations can be made by those skilled in the art without departing from the scope of the present invention.

What is claimed is:

1. An electrolyte solution, comprising:
a lithium salt, an electrolyte solvent, and an additive, wherein the additive is an aniline compound having a structure of Formula 1 or a derivative thereof:

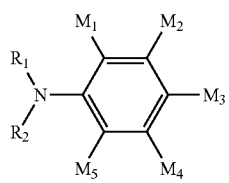

Formula 1 in which $R_1$ and $R_2$ are each independently selected from at least one of —H, —$(CH_2)_{n1}CH_3$, and —$(CH_2)_{n2}CF_3$, where $0 \leq n1 \leq 3$, and $0 \leq n2 \leq 3$; and $M_1$-$M_5$ are each independently selected from at least one of —H, —F, —Cl, —Br, —$(CH_2)_{n3}CH_3$, and $R_3$—S—$R_4$, where $0 \leq n3 \leq 3$, and at least one of $M_1$-$M_5$ is selected from a thioether group $R_3$—S—$R_4$, where $R_3$ is selected from —$(CH_2)_{n4}$—, in which $0 \leq n4 \leq 1$, and $R_4$ is selected from one or two of an aniline group and —$(CH_2)_{n5}CF_3$, where $0 \leq n5 \leq 3$.

2. The electrolyte solution according to claim 1, wherein the additive is selected from at least one of 4-trifluoromethylthioaniline, 2-trifluoromethylthioaniline, 3-trifluoromethylthioaniline, 3-chloro-2-trifluoromethylthioaniline, 3-chloro-4-trifluoromethylthioaniline, 3-fluoro-4-trifluoromethylthioaniline, 3-fluoro-2-trifluoromethylthioaniline, 4,4'-dithiodianiline, 2-chloro-4,4'-dithiodianiline, 3-chloro-4,4'-dithiodianiline, 2-fluoro-4,4'-dithiodianiline, and 3-fluoro-4,4'-dithiodianiline.

3. The electrolyte solution according to claim 1, wherein a content of the additive is 0.1-10 wt % based on a total weight of the electrolyte solution.

4. The electrolyte solution according to claim 3, wherein the content of the additive is 0.1-3 wt % based on the total weight of the electrolyte solution.

5. The electrolyte solution according to claim 1, wherein the lithium salt is selected from at least one of $LiPF_6$, $LiClO_4$, $LiBF_4$, $LiAsF_6$, $LiSiF_6$, $LiAlCl_4$, LiBOB, LiODFB, LiCl, LiBr, Lii, $LiCF_3SO_3$, $Li(CF_3SO_2)_3$, $Li(CF_3CO_2)_2N$, $Li(CF_3SO_2)_2N$, $Li(SO_2C_2F_5)_2N$, $Li(SO_3CF_3)_2N$, and $LiB(C_2O_4)_2$.

6. The electrolyte solution according to claim 1, wherein the electrolyte solvent is a carbonate solvent comprising at least one of ethylene carbonate, propylene carbonate, dimethyl carbonate, diethyl carbonate, and methyl ethyl carbonate.

7. The electrolyte solution according to claim 1, further comprising at least one of dimethyl sulfoxide, γ-butyrolactone, adiponitrile, and ethylene sulfite, wherein a volume ratio of the carbonate solvent to the dimethyl sulfoxide is 23:2; a volume ratio of the carbonate solvent to the γ-butyrolactone is 19:1; a volume ratio of the carbonate solvent to the adiponitrile is 9:1; and a volume ratio of the carbonate solvent to the ethylene sulfite is 93:7.

8. A positive electrode, comprising a positive electrode current collector and a positive electrode material layer located on the surface of the positive electrode current collector, wherein the surface of the positive electrode material layer has a polymer film made of an additive as defined in claim 2.

9. The positive electrode according to claim 8, wherein the polymer is at least one selected from poly(4-trifluoromethylthioaniline), poly(2-trifluoromethylthioaniline), poly(3-trifluoromethylthioaniline), poly(3-chloro-2-trifluoromethylthioaniline), poly(3-chloro-4-trifluoromethylthioaniline), poly(3-fluoro-4-trifluoromethylthioaniline), poly(3-fluoro-2-trifluoromethylthioaniline), poly(4,4'-dithiodianiline), poly(2-chloro-4,4'-dithiodianiline), poly(3-chloro-4,4'-dithiodianiline), poly(2-fluoro-4,4'-dithiodianiline), and poly(3-fluoro-4,4'-dithiodianiline).

10. The positive electrode according to claim 8, wherein the polymer film is a protective film formed with the additive on the surface of the positive electrode at a voltage of 3.5-4.2 V.

11. A lithium-ion battery, comprising
a housing, and a battery cell and an electrolyte solution accommodated in the housing, the battery cell comprising a positive electrode, a negative electrode, and a separator between the positive electrode and the negative electrode,
wherein the electrolyte solution is an electrolyte solution comprising:
a lithium salt, an electrolyte solvent, and an additive, wherein the additive is an aniline compound having a structure of Formula 1 or a derivative thereof:

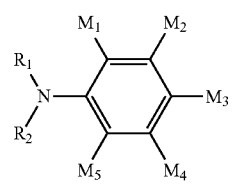

Formula 1 in which $R_1$ and $R_2$ are each independently selected from at least one of —H, —$(CH_2)_{n1}CH_3$, and —$(CH_2)_{n2}CF_3$, where $0 \leq n1 \leq 3$ and $0 \leq n2 \leq 3$; and $M_1$-$M_5$ are each independently selected from at least one of —H, —F, —Cl, —Br, —$(CH_2)_{n3}CH_3$, and $R_3$—S—$R_4$, where $0 \leq n3 \leq 3$, and at least one of $M_1$-$M_5$ is selected from a thioether group $R_3$—S—$R_4$, where $R_3$ is selected from —$(CH_2)_{n4}$—, in which $0 \leq n4 \leq 1$, and $R_4$ is selected from one or two of an aniline group and —$(CH_2)_{n5}CF_3$, where $0 \leq n5 \leq 3$.

12. The lithium-ion battery according to claim 11, wherein the positive electrode comprises a positive electrode current collector and a positive electrode material layer, and the positive electrode material layer comprises a positive electrode active substance, a conductive agent, and positive electrode binder, wherein the positive electrode active substance is $LiNi_{0.5}Mn_{1.5}O_4$ having a spinel structure or $LiNi_{0.5}Mn_{0.5}O_2$ having a lamellar structure.

13. The lithium-ion battery according to claim 12, wherein the positive electrode active substance is $LiNi_{0.5}Mn_{1.5}O_4$ having a spinel structure.

14. The lithium-ion battery according to claim 11, wherein the additive is selected from at least one of 4-trifluoromethylthioaniline, 2-trifluoromethylthioaniline, 3-trifluoromethylthioaniline, 3-chloro-2-trifluoromethylthioaniline, 3-chloro-4-trifluoromethylthioaniline, 3-fluoro-4-trifluoromethylthioaniline, 3-fluoro-2-trifluoromethylthioaniline, 4,4'-dithiodianiline, 2-chloro-4,4'-dithiodianiline, 3-chloro-4,4'-dithiodianiline, 2-fluoro-4,4'-dithiodianiline, and 3-fluoro-4,4'-dithiodianiline.

15. The lithium-ion battery according to claim 11, wherein a content of the additive is 0.1-10 wt % based on a total weight of the electrolyte solution.

16. The lithium-ion battery according to claim 15, wherein the content of the additive is 0.1-3 wt % based on the total weight of the electrolyte solution.

17. The lithium-ion battery according to claim 11, wherein the electrolyte solvent is a carbonate solvent comprising at least one of ethylene carbonate, propylene carbonate, dimethyl carbonate, diethyl carbonate, and methyl ethyl carbonate.

18. The lithium-ion battery according to claim 11, wherein the electrolyte solution further comprises at least one of dimethyl sulfoxide, γ-butyrolactone, adiponitrile, and ethylene sulfite, wherein a volume ratio of the carbonate solvent to the dimethyl sulfoxide is 23:2; a volume ratio of the carbonate solvent to the γ-butyrolactone is 19:1; a volume ratio of the carbonate solvent to the adiponitrile is 9:1; and a volume ratio of the carbonate solvent to the ethylene sulfite is 93:7.

* * * * *